J. EPENETER & B. GRAHL,

Assignors to J. M. GORHAM.

Wash-Board.

No. 9,022. Reissued Jan. 6, 1880.

WITNESSES

Frank M. Habst.

Willard Fracker

INVENTORS

John Epeneter.

B. Grahl.

By Leggett and Leggett. ATTORNEYS

N. PETERS, PHOTO-LITHOGRAPHER, WASHINGTON, D. C.

UNITED STATES PATENT OFFICE.

JOHN EPENETER AND BERNHARD GRAHL, OF COUNCIL BLUFFS, IOWA, ASSIGNORS TO JOHN M. GORHAM.

WASH-BOARD.

SPECIFICATION forming part of Reissued Letters Patent No. 9,022, dated January 6, 1880.

Original No. 127,325, dated May 28, 1872. Application for Reissue filed October 18, 1879.

*To all whom it may concern:*

Be it known that we, JOHN EPENETER and BERNHARD GRAHL, of Council Bluffs, in the county of Pottawattamie, in the State of Iowa, have invented certain new and useful Improvements in Wash-Boards; and we do hereby declare the following to be a full, clear, and exact description thereof, reference being had to the accompanying drawings, forming a part of this specification.

Our invention relates to wash-boards; and it consists in the combination, with a wash-board, of a protector movably attached thereto, and constructed, by moving or swinging, to yield to the pressure upon it of the body of the operator.

Figure 1:
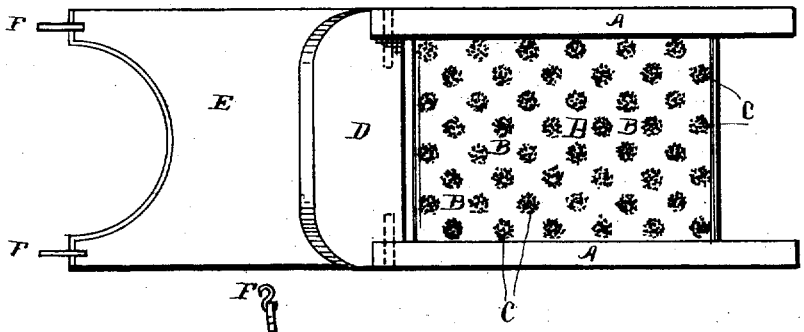
Figure 2:
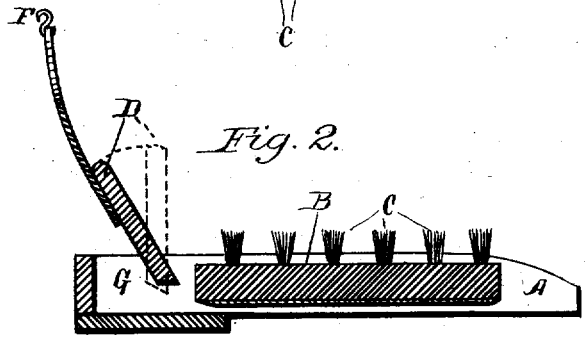

In the drawings, Figure 1 is a plan view of a device according to our invention. Fig. 2 is a longitudinal vertical section thereof; and Fig. 3, a view in cross-section, taken through the board at the point of union between the protector and the wash-board frame, showing the pivotally swinging or moving connection between said protector and wash-board frame.

Figure 3:
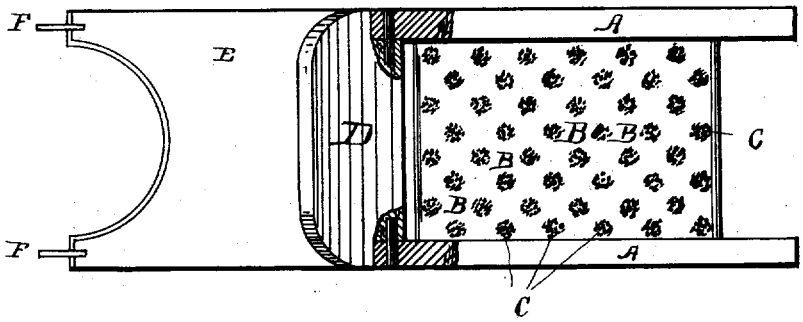

Fig. 3, just above mentioned, we have added in this application. Our original model embodies the construction shown in said figure, which figure was inadvertently omitted in our original application.

In the said drawings, A represents the usual frame of a wash-board, which may be of any description. B is the rubbing-surface, which, in the present instance, is provided with bristles C, extending upward and attached in the same manner as on any brush.

At the upper end of the board B, and movably attached to the frame A, is placed our protector D. This protector D is intended to shield the person of the operator from suds and splashing water during the use of the board. It is loosely or movably attached to the frame A, whereby it is susceptible of moving and yielding, as may be necessary, to pressure.

In order, further, to shield the person of the operator an apron, E, with suitable device F for attaching it to the person, may, if desired, be attached to and supplement the protector D. This apron E may or may not be used.

The protector herein shown is located so as to form a space, G, in its rear, where the soap may be maintained in a dry condition.

The feature of the swinging or movably-attached protector D to the wash-board frame is, so far as we are aware, novel with ourselves. It operates, as before mentioned, both as a protector to the person of the operator and as a rest to lean against, which, by its moving or yielding function, will be less wearing than were the operator to lean against a rigid and unyielding substance.

In washing with the bristle-board, as herein shown, the soap is rubbed on the brushes C C instead of rubbing soap on the clothes; therefore the soap will remain on the board until used up, whereas in other boards it will run down into the tub as soon as the washing is rubbed over it. As soon as the soap is rubbed over the bristles it forms a foam, which will remain until no more soap is in them.

So far, however, as respects the employment of our protector, we desire to be distinctly understood that we do not limit its use, narrowly, to its employment in connection with a bristle or brush board, as it is apparent that it would be equally operative in connection with boards of any description whatever.

What we claim is—

1. In combination with a wash-board, a swinging or yielding protector attached to the upper portion of said board, and constructed to act as a protector in its various positions, substantially as shown.

2. The protector D, pivotally attached to the upper portion of the frame of a wash-board, substantially as and for the purposes shown.

3. The combination, with a wash-board, of a protector, D, located and attached substantially as described, so that a soap-receptacle, G, shall be formed behind or above said protector, substantially as and for the purpose shown.

4. The combination, with a wash-board, of a protector, D, and supplemental apron or flexible protector E, substantially as and for the purpose shown.

5. The protector D and supplemental apron or flexible protector E and attaching device F, combined substantially as and for the purpose shown.

In testimony whereof we have hereunto signed our names this 21st day of February, A. D. 1879.

JOHN EPENETER.
BERNHARD GRAHL.

Witnesses:
PETER WEIS,
HENRY HANSON.